April 4, 1939.　　　C. H. SWEITZER　　　2,153,104
MOTOR VEHICLE LAMP AND SIGNAL SUPPORT
Filed Nov. 16, 1937
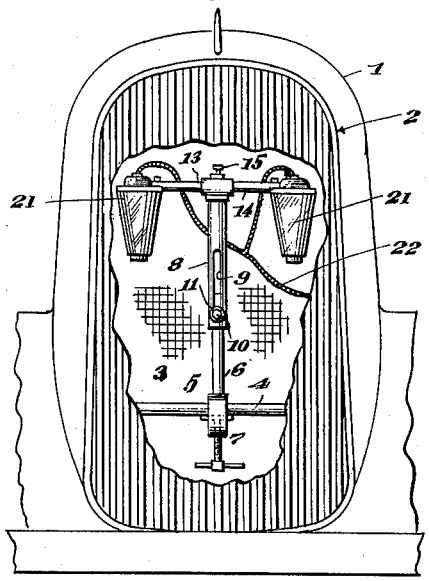
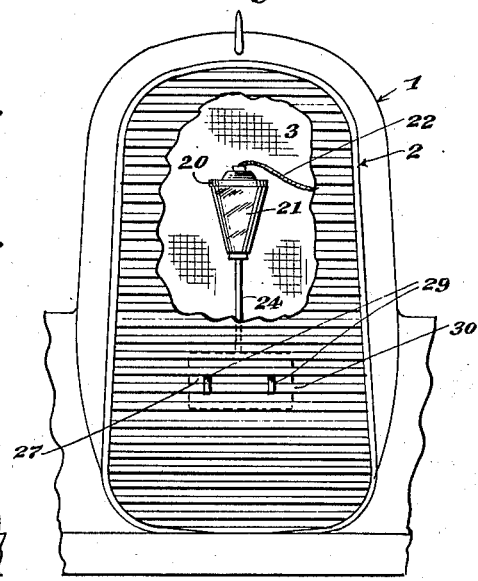
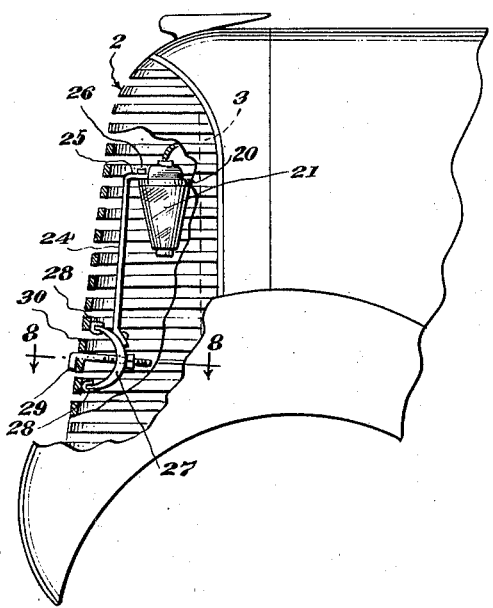
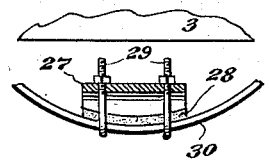
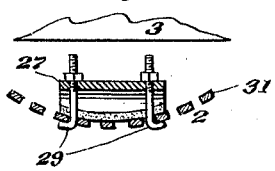
Inventor,
CARROLL H. SWEITZER.
By E. E. Vrooman & Co.,
Attorneys Patented Apr. 4, 1939

2,153,104

UNITED STATES PATENT OFFICE 2,153,104

MOTOR VEHICLE LAMP AND SIGNAL SUPPORT

Carroll H. Sweitzer, New Freedom, Pa.

Application November 16, 1937, Serial No. 174,842

3 Claims. (Cl. 240—57)

This invention relates to a motor vehicle lamp and signal support.

An object of the invention is the construction of a novel lamp support, peculiarly adapted for positioning between the grille and radiator of a motor vehicle of the present day type.

Another object of the invention is the construction of a lamp support adapted for beautifying the appearance of a motor vehicle at night.

A still further object of the invention is the construction of a lamp support, whereby the lamps are electrically connected to a source of electricity, so that the lamps may be used for parking lamps, or can be used as signaling lamps, or the lamps may be used in the event the standard headlights of the motor vehicle are burned or inoperative.

With the foregoing and other objects in view, the invention comprises certain novel constructions, combinations and arrangements of parts as will be hereinafter fully described, illustrated in the accompanying drawing, and more particularly pointed out in the appended claims.

In the drawing:

Figure 1 is a view in front elevation of the invention, showing the same applied to a motor vehicle.

Figure 2 is another embodiment of the present invention, shown partly in dotted lines and partly in front elevation, while Figure 3 is a view in side elevation of the same.

Figure 4 is a sectional view, taken on line 8—8, Fig. 3, and looking in the direction of the arrows.

Figure 5 is a horizontal sectional view, similar to Figure 4, showing the claw bolts in a different position.

Referring to the drawing by numerals, and to the embodiment illustrated in Figure 1, the motor vehicle 1 is provided with the grille 2 having vertical bars, and 3 is the radiator. A horizontal standard rod 4 is between grille 2 and radiator 3, near the lower ends of same.

The lamp support 5 comprises a solid vertical standard 6 which is provided on its lower end with a clamp device 7. A curved vertical tube 8 is mounted to slide upon standard 6, and this tube is provided with an elongated slot 9. A bolt 10 is threaded into standard 6, with a portion thereof positioned in slot 9. Interposed between the head of the bolt and tube 8 is a washer 11. By this arrangement the curved tube 8 can be adjusted to a desired position, upon standard 6, and retained fixed therein. A rotatable horizontal tube 14 is mounted in the sleeve 13, and this tube 14 can be retained in adjusted positions through the medium of set screw 15.

Lamps 21 are mounted on the tube 14 and may be of any desired shape, and furnished with any colored shade.

The lamps are suitably wired, as at 22. A suitable source of electricity is in circuit with the wiring 22. It will therefore be seen that the lamps may be used for illuminating the interior of the front portion of a motor vehicle, which is usually very dark at night; further the lamps can be utilized for beautifying the appearance of the motor vehicle at night by reason of their rays (in color) showing through the grille. Further, the lamps of this invention may be used for parking purposes, showing distinctly to the oncoming traffic, and, if desired, the lamps may be suitably wired (not shown) to utilize one lamp to indicate a right turn and the other lamp a left turn, to oncoming traffic, etc., by the shade of each lamp being in suitable color.

The disclosure in Figure 1, illustrates how the lamps may be turned downwardly by loosening the set screw 15, revolving tube 14, and then setting said screw tight, to retain the lamps in their adjusted position.

In the embodiment illustrated in Figures 2 to 5, the vertical standard 24 is similar in function to the support of the hereinbefore described embodiment, which support comprises the standard 6 and tube 8. The upper end of standard 24 is provided with a flat lamp support 25 with a screw 26, which screw extends into the base flange 20 of the lamp 21. The clamp device secured to the lower end of standard 24 comprises a concavo-convex body 27, which is normally in a horizontal position. This body 27 is provided on its two longitudinal edges with flexible shields 28 that contact with the grille 2. The shields 28 not only prevent marring the grille but also make the connection noiseless. A pair of claw bolts 29 extend through the central portion of the concavo-convex body and between some of the bars of the grille, gripping these bars to hold the device thereon. In Figure 4 the claw bolts 29 are shown on a horizontal bar 30 of a grille 2, and in Figure 5 the claw bolts are shown on vertical bars 31 of a grille 2.

From the foregoing description and the drawing it will be seen that I have constructed a novel lamp support comprising means, in combination, on a motor vehicle for supporting a standard, broadly speaking, between a grille and a radiator, which standard includes a horizontal flat lampcontacting support, with a screw thereon for attaching the lamp thereto.

While I have described the preferred embodiments of my invention and illustrated the same in the accompanying drawing, certain minor changes or alterations may appear to one skilled in the art to which this invention relates during the extensive manufacture of same, and I, therefore, reserve the right to make such changes or alterations as shall fairly fall within the scope of the appended claims.

What I claim is:

1. In a device of the class described the combination of a standard, a clamp device secured to said standard, said clamp device comprising a horizontal concavo-convex body, shields over the longitudinal edges of said body, claw bolts extending through the center of said body, and lamp-attaching means supported by the upper end of said standard.

2. In a device of the class described, the combination of a standard, a clamp device secured to said standard, said clamp device comprising a hollow body adapted to engage a grille at two edges of said body, grille engaging means extending through said body between said grille-engaging edges, and means supporting a lamp on said standard.

3. In a device of the class described, the combination of a curved body, grille-engaging means adjustably mounted on said curved body, a standard attached at its lower end to said curved body, and lamp supporting means attached to the upper end of said standard.

CARROLL H. SWEITZER.